C. E. AVERY.
ELECTRIC BATTERY.
APPLICATION FILED SEPT. 1, 1916.
1,236,135.
Patented Aug. 7, 1917.
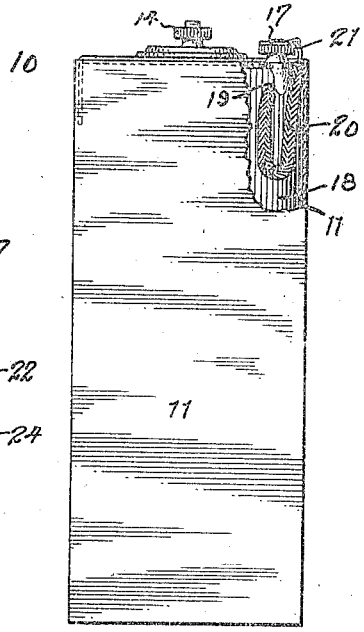
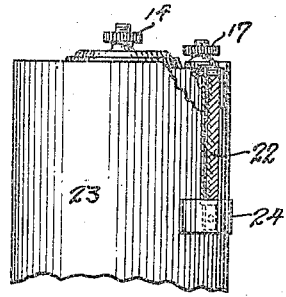
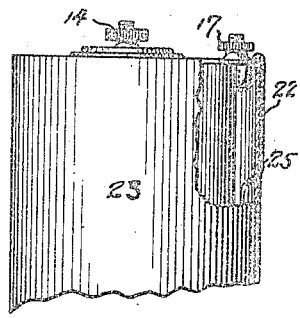
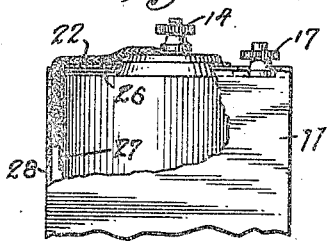
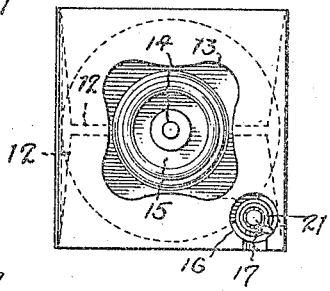
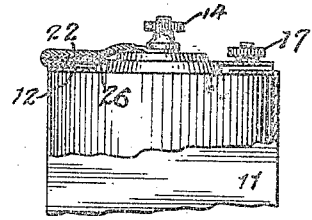
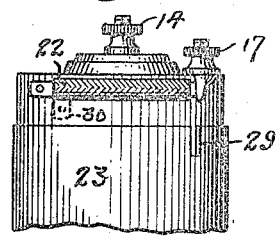
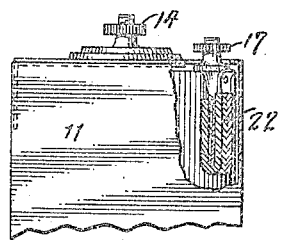
Inventor:
CHARLES E. AVERY
by
Attys.

UNITED STATES PATENT OFFICE.

CHARLES E. AVERY, OF TRENTON, NEW JERSEY, ASSIGNOR TO MANHATTAN ELECTRICAL SUPPLY COMPANY, OF NEW YORK, N. Y., A CORPORATION OF NEW JERSEY.

ELECTRIC BATTERY.

1,236,135.   Specification of Letters Patent.   Patented Aug. 7, 1917.

Application filed September 1, 1916. Serial No. 118,046.

*To all whom it may concern:*

Be it known that I, CHARLES E. AVERY, a citizen of the United States of America, and residing at Trenton, in the county of Mercer and State of New Jersey, have invented a certain new and useful Improvement in Electric Batteries, of which the following is a specification.

My invention relates to electric battery and particularly to electric dry batteries, the object of my invention being to provide an improved connecting device by which a battery may be readily connected up in series with another battery or series of batteries.

In the accompanying drawings,

Figure 1 is a broken side elevation of a dry battery to which my invention is applied in one form;

Fig. 2 is a plan thereof; and

Figs. 3 to 8 inclusive are broken side elevations of dry batteries in which my invention is embodied in variously modified forms.

It has already been proposed to provide one pole of a dry battery with a conducting strap permanently secured thereto and adapted to make connection with the appropriate pole of another battery. But in the arrangement heretofore proposed (Conlan 1,193,764) the connector normally extends downward in the direction of its length between the outer pole or zinc of the battery and its surrounding insulating paper casing. In order to obtain access to the connector, it is necessary therefor to draw down the casing on the zinc until the connector is exposed sufficiently to permit it to be drawn up to position for use. This may in some instances be an undesirable arrangement, as for instance, where the battery casing is sealed, in which case it would be practically impossible to draw out the connector without breaking open the container.

There are various ways of overcoming this difficulty and I have shown only some of them in the accompanying drawing. Thus in Figs. 1 and 2 the battery 10 is arranged in a container 11 of square shape and having end flaps 12 oppositely folded across the top of the battery, as indicated, and sealed. An opening 13 permits access to the binding screw 14 on the center or carbon pole 15 and a second opening 16, at a corner of the container, permits access to the binding screw 17 on the side, or zinc terminal 18. Attached to the latter in any suitable fashion, is one end 19 of a connector 20, here shown as a piece of insulated wire bared at its opposite ends and having a permanent soldered eye 21 at its free end. The body of the connector is carried down in a loop in the corner space between the container and the battery, but its free end 21 is brought up and temporarily held in any suitable fashion at the binding screw 17—as for instance by placing it around the end of the binding post.

It is obvious that when it is desired to connect this battery to another battery, it is only necessary to catch hold of the free end 21 of the connector 20, draw up the length of the latter which is confined between the battery and the container, and secure the grasped end to the opposite pole terminal of the adjacent battery. It is unnecessary to break the seal of the container when the latter is sealed, and it is a convenience in any case, not to be required to displace the container on the battery in order to reach and make use of the connector. Equal protection and security from accidental contacts is attained, since the free end of the connector is no more exposed than the battery terminal 17 itself.

In Fig. 3 a modified form is shown. Here the connector 22, in the form of a flat strip of copper or the like, is secured at one end to the battery zinc and its opposite end carried down outside the container 23 (here of cylindrical form) and secured by a paster 24 of paper or other insulating material. The intermediate portion of the connector is covered with insulation of any suitable sort. When it is desired to use the connector it is only necessary to break the paster 24 and raise the previously bound end of the connector to position for use.

The construction shown in Fig. 4 resembles that of Fig. 3 in that the body of the connector is carried down on the outside of the container. Its free end however instead of being bound by an exterior paster, is passed inward through a slot 25 into the space between the container and the zinc shell of the battery. The bend in the metal of the connector at this point is sufficient to insure the maintenance of its position until withdrawal for use is desired. The slot 25 must of course be formed at such a point with relation to the length of the connector that only the insulated portion thereof remains outside the casing until used.

The connector of Fig. 5 is attached to the center contact of the battery instead of to the side contact. Inasmuch as the cover flap 26 of the container overlies the zinc and is provided with a tab 27 passing down between the zinc shell of the battery and the side wall 28 of the container, there is no danger of short-circuiting the battery if the connector is passed, as shown, across the outer face of the cover flap 26 and its free end inserted between the tab 27 and the side wall 28 of the casing. The length of the tab 27 is such that it reaches below the end of the connector and this effectually spaces and insulates the connector from the zinc shell. Obviously it is only necessary to pull out the inserted end of the connector when the latter is to be used.

In Fig. 6 the connector is also attached to the center contact and carried across the cover flap 26 of the container but at right angles to the direction of that shown in Fig. 5, and doubled back upon itself so that the free end may be inserted between the cover flap 26 and one of the subjacent top flaps 12 (see Fig. 2) which are bent over the zinc shell of the battery and thus effectively isolate the connector therefrom.

In Fig. 7 the connector is again attached to the zinc shell of the battery, but it is now carried around the circumference of the latter adjacent the terminal end and lies normally between the zinc and the casing 23 which is here of the cylindrical type. The fit of the casing is so tight that the connector is safely maintained in position under ordinary circumstances by the frictional engagement thereof between the casing and the zinc. Nevertheless the connector may be readily withdrawn by merely inserting the end of a screw driver, or key, or even a finger nail, into engagement with the free end of the connector and lifting the latter clear of the edge of the casing, where it may be firmly grasped and pulled completely out, without disturbing the battery with relation to the casing. This is particularly true when the connector is merely an insulated wire as in Figs. 1 and 2. While the same may be accomplished with a flat connector, as shown in Fig. 7, it is preferable to slide the casing down a half inch or so to clear the connector, which may then be swung out away from the battery and the casing shoved back to position, the connector now entering a slot 29 provided for the purpose. If desired, the free end of the connector may be offset as at 30 so that it is not in any danger of exposure. Of course its contact with the zinc is of no moment.

The construction of Fig. 8 is identical with that of Fig. 1, except that a flat connector, instead of a wire is used.

Various other arrangements to accomplish the purposes above set forth will readily occur to those skilled in the art without departing from what I claim as my invention.

I claim as my invention:—

1. A dry battery, an insulating container therefor, a pole member for said battery and a flexible connector having one end secured to said pole member and its other end held in predetermined position to prevent short-circuiting, but accessible in the unaltered relative positions of the battery and its container, and said end being suitable for connection to a pole of a coöperating battery.

2. A dry battery, an insulating container sealed in position thereon, a pole member for said battery and a flexible connector having one end secured to said pole member and its other end held in predetermined position to prevent short-circuiting but accessible without breaking the seal of said container, and said end being suitable for connection to a pole of a coöperating battery.

3. In a dry battery, an insulating container therefor, a pole member for said battery and a flexible connector having one end secured to said pole member and its other end held in predetermined position to prevent short-circuiting, said connector comprising a wire having its free end formed into a soldered loop to facilitate connection with the binding screw of a coöperating battery terminal.

4. A dry battery, an insulating container therefor, a pole member for said battery and a battery connector having one end secured to said pole member and its opposite end suitable for connection to a pole of a coöperating battery, said opposite end being covered by a frangible seal of insulating material.

In testimony whereof I have signed my name.

CHARLES E. AVERY.